Aug. 19, 1941.   J. S. PARSONS   2,253,395
NETWORK DISTRIBUTION SYSTEM
Filed Sept. 19, 1939   2 Sheets-Sheet 1
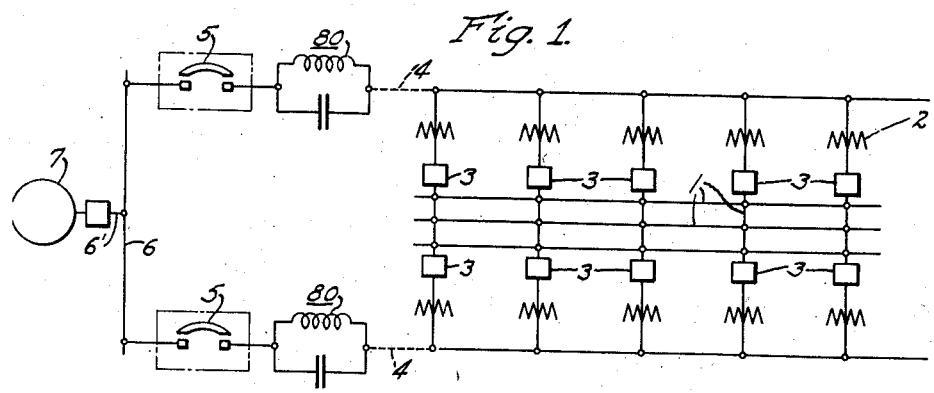
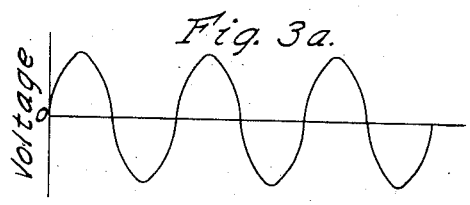
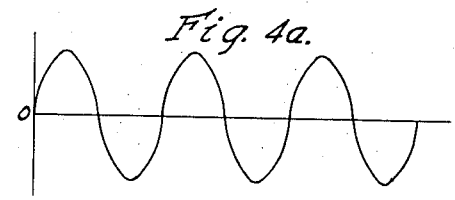
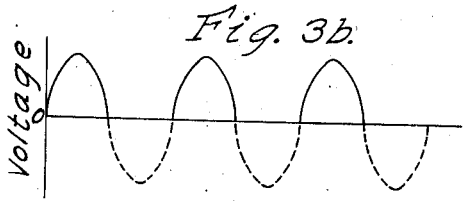
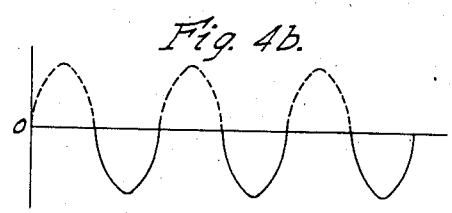
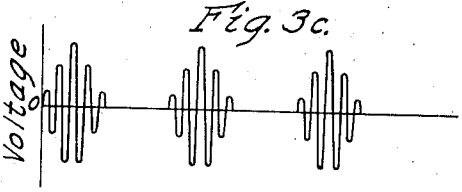
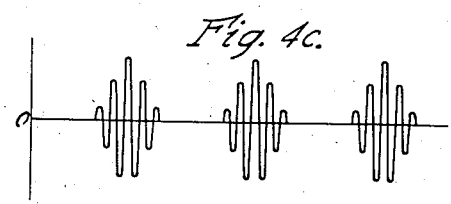
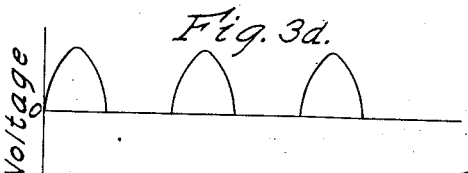
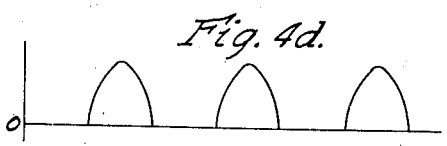
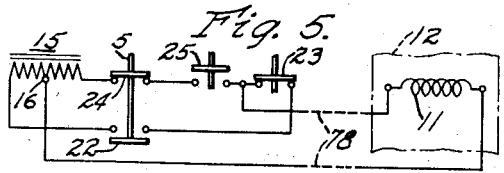
WITNESSES:
INVENTOR
John S. Parsons
BY
ATTORNEY Aug. 19, 1941.   J. S. PARSONS   2,253,395
NETWORK DISTRIBUTION SYSTEM
Filed Sept. 19, 1939   2 Sheets-Sheet 2

WITNESSES:
Leon M. Garman
C. L. Freedman

INVENTOR
John S. Parsons.
BY
ATTORNEY

Patented Aug. 19, 1941

2,253,395

UNITED STATES PATENT OFFICE 2,253,395

NETWORK DISTRIBUTION SYSTEM

John S. Parsons, Swissvale, Pa., assignor to Westinghouse Electric & Manufacturing Company, East Pittsburgh, Pa., a corporation of Pennsylvania Application September 19, 1939, Serial No. 295,571

10 Claims. (Cl. 171—97)

This invention relates to electrical distribution systems and it has particular relation to systems having network protectors which are controlled from a remote point.

As generally understood, a network distribution system comprises two or more feeder circuits, each feeder circuit being connected to a generator or station bus through a feeder circuit breaker. Each feeder also is connected to a common distribution circuit or grid through a plurality of network transformers and network protectors. The most common type of network protector is self-contained and comprises a circuit breaker which is opened or closed in accordance with the condition of a master relay. This master relay contains phasing circuits for permitting the closure of the network circuit breaker only when the voltages and connections of the feeder circuit and the network circuit are such that a flow of power from the feeder circuit to the network circuit is assured. The master relay also includes means for tripping the network circuit breaker when the flow of power reverses and flows from the network circuit to the feeder circuit. In addition, the network protector generally includes an auxiliary phasing relay for preventing pumping of the network circuit breaker under certain conditions of the feeder and network circuits.

It has been proposed that instead of a self-contained network protector a network protector be employed which is controlled from a remote point such as adjacent the feeder circuit breaker. Such a control may be effected by running pilot wires between the feeder circuit breaker and the network protector for controlling the operation of the network protector. Alternatively the network protector may be controlled from the remote point by applying to the feeder circuit a superimposed or carrier frequency which is detected at the network protector and employed for controlling the operation thereof. Such pilot wire and superimposed frequency control systems are open to certain objections. In the superimposed frequency system it is necessary to guard against interference created by the superimposed frequency in adjacent telephone or other circuits. Because of the dangers involved it is objectionable to have continuously charged pilot wires extending between the feeder circuit breaker and the network circuit breaker. In addition, the continuous excitation proposed for pilot wire and superimposed frequency control is objectionable because of wastage of power and increased cost of maintenance.

In accordance with my invention a network protector is controlled from a point adjacent the feeder circuit breaker by means of superimposed frequency or pilot wire control. In either case the energization of the control system is limited to the small period necessary for effecting the control operation. This may be obtained by including in the energizing circuit for the control system one or more timing instrumentalities or relays for deenergizing the control system after a lapse of time sufficient to assure completion of the control operation. At the same time the control system may be conditioned for a subsequent operation.

It is, therefore, an object of my invention to provide a network distribution control system which is energized only during the time necessary to effect a control operation.

It is another object of my invention to provide a network distribution control system having timing instrumentalities for interrupting the energization of the control system following the completion of a control operation.

It is another object of my invention to provide a network distribution system with a remote control of improved reliability.

Other objects of my invention will be apparent from the following description taken in conjunction with the accompanying drawings, in which:

Figure 1 is a diagrammatic view in single line of a network distribution system embodying my invention;

Figs. 3a to 3d and Figs. 4a to 4d are graphical representations of voltage plotted against time illustrative of conditions existing in the system illustrated in Figs. 1 and 2, and Fig. 5 is a diagrammatic view of a modified system for transmitting signals to a network protector in accordance with my invention.

Figure 2:
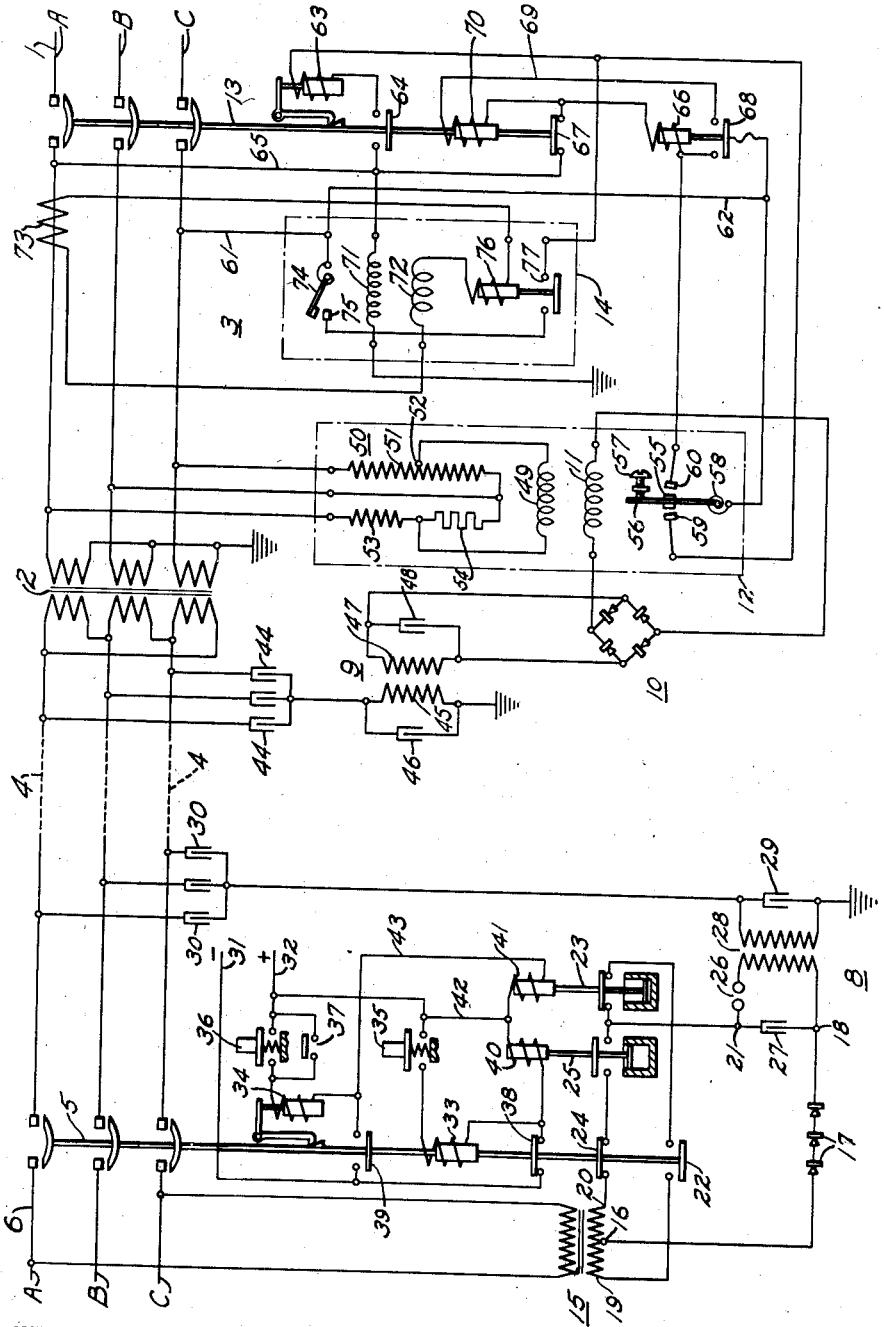
Fig. 2 is a diagrammatic detail view of a portion of the system illustrated in Fig. 1.

Referring to the drawings, Fig. 1 shows a network distribution system or grid 1 which is energized through network transformers 2 and network protectors 3 from a pair of feeders 4. Each feeder 4 is connected through a feeder circuit breaker 5, a station bus 6 and a station circuit breaker 6' to a generator 7 which may be a three-phase generator designed for operation at a conventional frequency such as 60 cycles per second. Although I have illustrated two feeders 4 for the distribution network it is obvious that more feeders may be employed as desired, and these feeders may be connected to one or more generators 7.

Referring to Fig. 2, I have illustrated a portion of the distribution network 1, a network transformer 2, feeder 4 and feeder circuit breaker 5 on an enlarged scale. The system is illustrated as a three-phase system having phase conductors A, B and C and the network transformer is indicated as a delta-star transformer with the star secondary windings grounded. Although this is a well known connection of the network transformer, it is obvious that other known transformer connections may be employed in its place.

For controlling the network protector from a point adjacent the feeder circuit breaker 5, I provide an oscillator 8 which is employed for impressing between each of the feeder conductors 4 and ground a voltage of a frequency differing from the frequency of the generator 7. At a point adjacent the network transformer 2 the energy applied by the oscillator 8 to the feeder circuit is diverted through a band pass filter 9 and the output of the band pass filter is supplied through a full wave rectifier 10 to one winding 11 of a relay 12. In accordance with the energization applied through the oscillator 8 to the feeder 4, the relay 12 is designed to trip or close a network circuit breaker 13 provided as an element of the network protector 3. An additional relay 14 may be employed for tripping the circuit breaker 13 when the direction of power flow in the system reverses and flows from the network system 1 to the feeder circuit 4.

The oscillator 8 is energized from the station bus 6 through a transformer 15 which has a primary winding connected across two conductors A and C of the station bus. The secondary winding of the transformer 15 is provided with a center tap 16 which is connected through a rectifier 17 to one terminal 18 of the oscillator. The rectifier 17 may be of any convenient design such as the dry disc copper oxide type of rectifier.

For completing the energization of the oscillator 8 the two terminals 19 and 20 of the secondary winding of the transformer 15 are so disposed that either may be connected through suitable switching means to the remaining terminal 21 of the oscillator 8. To this end the left-hand terminal 19 may be connected through a pallet switch 22 on the circuit breaker 5 and the back contacts of a timing relay 23 to the terminal 21. Similarly, the right-hand terminal 20 may be connected through a pallet switch 24 on the circuit breaker 5 and the back contacts of a timing relay 25 to the oscillator terminal 21. It will be observed that the pallet switch 22 is closed when the circuit breaker 5 is closed and that the pallet switch 24 is closed when the circuit breaker 5 is open. The purpose of the selective connection of the terminals 19 and 20 of the transformer secondary winding to the terminal 21 of the oscillator is to provide a selective control for varying the phase of the output of the oscillator 8 as will be explained below.

The oscillator 8 may be of any standard design but as illustrated it consists of a spark gap 26 which is connected in a tuned circuit with a condenser 27 and the primary winding of a coupling inductance 28. The secondary winding of the coupling inductance is provided with a tuning condenser 29 and the voltage across this tuning condenser is applied between ground and each of the phase conductors of the feeder circuit 4 through a plurality of coupling condensers 30 which preferably are designed to pass current of the frequency generated by the oscillator without substantially passing current generated by the generator 7. As examples of suitable parameters the spark gap 26 may be designed to break down at about 700 to 800 volts to start oscillating at a high frequency and the secondary winding of the transformer 15 may have a voltage output of the order of 2400 volts between the center tap 16 and each terminal 19 or 20. Although the frequency selected for the oscillator 8 may vary appreciably, in order to provide a minimum of interference with communication circuits, to utilize the transformers 2 as blocking transformers, to keep the size of the superimposed frequency equipment as small as possible and to prevent interference with high frequency harmonics which may be present on the system, I prefer to employ a frequency of approximately 25 to 50 kilocycles.

The output of the oscillator 8 will differ in time phase according to whether the terminal 19 or the terminal 20 of the transformer 15 is connected to the oscillator. This may be understood more clearly by reference to Figs. 3a to 3c and Figs. 4a to 4c which represent graphs of voltage plotted against time. In Fig. 3a the curve represents the voltage between the terminal 19 and the center tap 16 of the transformer 15 and in Fig. 4a the curve represents the voltage between the center tap 16 and the terminal 20, this voltage being equal to that of Fig. 3a. When the terminal 19 is connected to the oscillator 8, the voltage across the oscillator is that represented in full lines in Fig. 3b, that is the rectifier 17 tends to block the portions of the voltage wave shown in dotted lines in Fig. 3b. Consequently, the output of the oscillator 8 will be as indicated in Fig. 3c. Each train of oscillations, of course, is generated during the full line portion of the voltage wave shown in Fig. 3b.

When the terminal 20 of the transformer 15 is connected to the oscillator, the voltage applied to the oscillator 8 is that represented in full lines in Fig. 4b, the portion shown in dotted lines being blocked by the rectifier 17. It will be observed that the voltage shown in full lines in Fig. 4b is displaced in time phase from that shown in full lines in Fig. 3b. As illustrated in Fig. 4c, the output of the oscillator 8 when energized by the voltage shown in Fig. 4b is a series of oscillation trains each occurring during a full line portion of the voltage wave shown in Fig. 4b. By comparing Figs. 3c and 4c it will be noted that the wave trains of the oscillator 8 for the two conditions of its connection to the transformer 15 differ in time phase by 180° as referred to the voltage waves of Figs. 3a and 4a. This difference in phase is employed for discriminating at the network protector between a closing operation and a tripping operation as will be explained more particularly below.

The purpose of the timing relays 23 and 25 is to interrupt the energization of the oscillator 8 following the completion of an operation of the network protector. Although the timing relays 23 and 25 and the pallet switches 22 and 24 may be operated manually to perform the desired operations, I have illustrated them as controlled by the position of the circuit breaker 5. This circuit breaker 5 is controlled in any suitable manner as from a direct current source represented by the conductors 31 and 32. As is well understood in the art, the circuit breaker 5 is provided with suitable closing means such as a closing solenoid 33 and a suitable tripping device such as the tripping solenoid 34. The closure of the circuit breaker 5 may be controlled by a pushbutton 35 and the tripping of the circuit breaker 5 may be controlled by a pushbutton 36 or by suitable contacts 37 which are controlled by fault responsive relays in a manner well understood in the art. When the pushbutton 35 is depressed, a closing circuit for the circuit breaker 5 is established from the conductor 32 through the pushbutton 35, the winding of the solenoid 33 and a pallet switch 38 which is closed when the breaker is open. When the pushbutton 36 is depressed, a tripping circuit is established from the conductor 32 through the pushbutton 36, the winding of the tripping solenoid 34 and a pallet switch 39 which is closed when the circuit breaker is closed.

In the position illustrated in Fig. 2 the oscillator 8 is completely deenergized for the reason that the relay 25 is in its energized condition in which its back contacts are open, and the pallet switch 22 is open because of the position of the circuit breaker 5. When the circuit breaker 5 is actuated to its closed condition by a depression of the pushbutton 35, the pallet switch 22 closes to connect the left-hand terminal 19 of the secondary winding of the transformer 15 through the pallet switch 22 and the back contacts of the timing relay 23 to the oscillator 8. The oscillator 8 thereupon breaks down and starts oscillating in order to transmit a closing signal to the network protector 3. At the same time the winding 40 of the relay 25 is deenergized, and the relay 25 operates to condition the circuit controlled by it for a subsequent operation. Since the pallet switch 24 is open, however, the closure of the contacts of the timing relay 25 has no immediate effect on the condition of the oscillator 8.

Also the closure of the circuit breaker 5 completes an energizing circuit for the winding 41 of the timing relay 23 through the pallet switch 39, this energizing circuit being traced from the conductor 32 through a conductor 42, the winding 41, the conductor 43 and the pallet switch 39 to the conductor 31. The timing relay 23 has, however, a time delay in its opening direction sufficient to permit the operation of all network protectors controlled by the oscillator 8 to their closed positions under normal conditions. A suitable time delay for this purpose may be of the order of 10 seconds. At the end of 10 seconds the timing relay 23 opens its back contacts to deenergize the oscillator 8.

Assuming the circuit breaker 5 to be closed, the timing relay 25 is in its deenergized position with its back contacts closed and the timing relay 23 is in its energized position with its back contacts open. If under these circumstances the circuit breaker 5 is tripped by operation of the pushbutton 36 or the relay contacts 37, the circuit breaker will drop to the position illustrated in Fig. 2 to again close the pallet switch 24. Since the timing relay 25 was deenergized at the start of the tripping operation, a circuit is completed from the right-hand terminal 20 of the secondary of the transformer 15 through the pallet switch 24 and the back contacts of the timing relay 25 to the oscillator 8 which thereupon breaks down and starts oscillating to transmit an opening signal to the network protectors controlled thereby. At the end of 10 seconds, the timing relay 25 opens its back contacts to the position illustrated in Fig. 2 and deenergizes the oscillator 8.

During the tripping operation it will be understood that the pallet switch 22 is open so that the left-hand terminal 19 of the secondary of the transformer 15 cannot be connected to the oscillator 8. That is, it is impossible to send out simultaneously a tripping and a closing signal to the network protectors associated with the oscillator 8. Any suitable design may be employed for the timing relays 23 and 25 but for the purpose of illustration they are shown as similar relays having dashpots for providing a time delay of the order of 10 seconds in the opening direction.

The closing and opening signals of the oscillator 8 are employed adjacent each network transformer 2 for establishing a potential across the band pass filter 9. For this purpose a plurality of coupling elements such as condensers 44 which may be similar to the coupling elements 30 are connected to each of the phase conductors A, B and C of the feeder circuit and the voltage to ground from these coupling elements is impressed on the band pass filter 9. As illustrated, the band pass filter comprises a coupling inductance having a primary winding 45 tuned by a condenser 46 and a secondary winding 47 tuned by a condenser 48. This band pass filter is designed to pass the frequency generated by the oscillator 8 but to block energy of the frequency of the generator 7. As above explained, the output of the band pass filter 9 is rectified through the full wave rectifier 10 and applied to the winding 11 of the relay 12. Any suitable rectifier, such as a copper oxide disc rectifier, may be employed. The effect of the rectifier 10 on the output of the oscillator 8 may be understood more readily by reference to Figs. 3d and 4d.

When the trains of high frequency waves illustrated in Fig. 3c are applied across the input to the rectifier 10, the output of the rectifier will supply a voltage similar to that illustrated in Fig. 3d. When the oscillator output corresponds to the curve shown in Fig. 4c, the voltage output of the rectifier 10 will be similar to that illustrated in Fig. 4d. It will be noted that the curves of Figs. 3d and 4d represent alternating voltages superimposed on direct current components and that the fundamental alternating voltage components of Figs. 3d and 4d differ in time phase by substantially 180°. By suitably designing the relay 12 this difference in time phase is employed for giving the relay 12 a directional action.

The relay 12 includes a motive element which is responsive to two-phase alternating current. A suitable device for this purpose is the induction disc type of an alternating current motor. The winding 11 and a second winding 49 constitute the two windings of the induction disc motor and are so disposed that when energized by two-phase alternating currents, they produce a shifting electrical field for rotating the induction disc. The winding 49 is energized through a voltage filter 50 in accordance with the positive symmetrical phase sequence component of voltage in the conductors A, B and C.

The design of the filter 50 may vary appreciably but preferably this filter is of the type illustrated in the Lenehan Patent 1,936,797, issued November 28, 1933, and assigned to the Westinghouse Electric & Manufacturing Company. Briefly, this filter comprises an autotransformer 51 having a tap 52 positioned to provide a voltage equal to approximately 40% of the total voltage across the auto-transformer. In addition, the filter includes a reactor 53 and a resistor 54 which are connected in series and are proportioned to produce a voltage drop across the resistor 54 which is approximately 40% of the voltage impressed upon the reactor and the resistor in series but displaced therefrom by approximately 60° lagging.

The induction disc motor of the relay 12 is designed to rotate in one direction if energized by a voltage corresponding to that illustrated in Fig. 3d and in the opposite direction when energized by a voltage corresponding to that illustrated in Fig. 4d, these voltages being displaced in time phase by 180°.

For control purposes the relay 12 is provided with a movable contact 55 which is mounted on a leaf spring 56 controlled by the relay motor. The leaf spring normally is biased against an adjusting screw 57 by means of a coil spring 58. When the relay 12 is energized to move the leaf spring 56 in a counterclockwise direction, as viewed in Fig. 2, the movable contact 55 is carried against the resistance of the spring 58 into contact with a fixed contact 59. When the motor of the relay 12 is energized to produce reverse rotation, the movable contact 55 is moved in a clockwise direction against the resistance of the leaf spring 56 to contact a stationary contact 60. These contacts 59 and 60 are employed, respectively, for controlling the tripping and closing operations of the network circuit breaker 13.

When the movable contact 55 engages the fixed contact 59, a circuit is established from the phase conductor C through a conductor 61, a conductor 62, the contacts 55 and 59, the winding 63 of a tripping solenoid, a pallet switch 64 provided on the network circuit breaker 13 and a conductor 65 to the phase conductor A for tripping the network circuit breaker 13.

When the movable contact 55 is actuated into engagement with the fixed contact 60, a circuit is established for a closing relay 66, from the phase conductor C through the conductors 61 and 62, the contacts 55 and 60, the winding of the relay 66, a pallet switch 67 and conductor 65 to the phase conductor A. Under the influence of this energization the relay 66 closes its front contacts to establish a holding circuit for itself from the phase conductor C through the conductors 61 and 62, a bridging contact 68 on the relay 66, the pallet switch 67 and the conductor 65 to the phase conductor A. In closing, the relay 66 also establishes a closing circuit for the circuit breaker 13 from the phase conductor C through the conductors 61 and 62, the bridging contact 68, a conductor 69, a winding 70 on the closing solenoid or other closing device for the circuit breaker, the pallet switch 67 and the conductor 65 to the phase conductor A. When the circuit breaker 13 closes, it opens the pallet switch 67 to deenergize the relay 66 which thereupon returns to its original condition.

Recapitulating the operation of the system thus far described in detail, with the parts in the condition shown in Fig. 2, if the pushbutton 35 is depressed the feeder circuit breaker 5 is actuated by its closing coil 33 to its closed position. At the same time the pallet switch 22 is closed to connect the left-hand portion of the secondary winding of the transformer 15 to the oscillator 8 and the oscillator thereupon breaks into oscillation and transmits a superimposed frequency along the feeder circuit 4. Also at the same time the timing relay 25 drops to condition the oscillator circuit for a subsequent tripping operation.

At the network protector the superimposed frequency is picked up by the band pass filter 9 and rectified by the rectifier 10 to send a pulsating electrical current through the winding 11 of the relay 12. This current, together with the current supplied to the winding 49 from the positive phase sequence filter 50, actuates the movable contact 55 against the fixed contact 60 to complete a closing circuit for the voltage relay 66 and the closing coil 70 of the circuit breaker 13 which thereupon closes.

After the expiration of a time delay sufficient to permit actuation of all network protectors connected to the feeder circuit 4, the timing relay 23 opens to deenergize the oscillator 8. With the oscillator 8 deenergized substantially no current passes through the winding 11 and the movable contact 55 returns to its floating position between the two fixed contacts 59 and 60. The return of the movable contact 55 to its floating position, together with the opening of the pallet switch 67 when the circuit breaker 13 closes, interrupts the energizing circuit for the relay 66 which returns to its original condition with its contacts open. Under these circumstances the network distribution system continues in operation with the oscillator 8 deenergized and no superimposed frequency current flowing in the feeder circuit 4 until it becomes necessary to trip the circuit breakers.

When this occasion arises, the pushbutton 36 is depressed or the relay contacts 37 closed to trip the feeder circuit breaker 5. The feeder circuit breaker thereupon opens and in opening closes the pallet switch 24 to connect the right half of the secondary of the transformer 15 to the oscillator 8. It will be understood that during the tripping operation the timing relay 25 is in its deenergized condition with its back contacts closed. As the wave trains produced by the oscillator 8 reach the network transformer 2, they are transmitted through the band pass filter 9 and the rectifier 10 to produce a pulsating current in the winding 11 of the relay 12. As above indicated, the pulsating current produced in the winding 11 during a tripping operation differs in phase from the pulsating current produced in the same winding during the closing operation by 180°. Consequently the movable contact 55 is actuated in an opposite direction against the fixed contact 59 to complete a circuit for the winding of the tripping solenoid 63 to trip the circuit breaker 13. At the same time the timing relay 23 which was in an energized condition at the start of the tripping operation drops to condition the oscillator 26 for a subsequent closing operation. After a time interval sufficient to assume the operation of all network protectors connected to the feeder circuit 4, the timing relay 25 opens to the position illustrated in Fig. 2 to again deenergize the oscillator 8. As a result of these operations, the feeder circuit 4 is completely deenergized with neither power current nor current of the superimposed frequency flowing therein.

It will be observed that the superimposed frequency is applied to and received from each phase conductor of the feeder circuit 4. Consequently, if one or two of the feeder circuit conductors should become disabled because of an open circuit or grounding at least one sound conductor would remain for transmitting the superimposed frequency between the oscillator 8 and the band pass filter 9. If such precautions are unnecessary, only one or two coupling condensers 30 and one or two coupling condensers 44 may be employed and attached to the same conductors of the feeder circuit.

In addition to serving as a tripping and closing relay controlled from the feeder circuit breaker, the relay 12 also serves as a phasing relay. Under normal conditions the phase rotation of the polyphase voltages applied to the filter 50 is in the order A, B, C. If during a repair of the feeder circuit two conductors are transposed, the phase rotation at the filter terminals reverses and the output of the filter becomes substantially zero. Consequently, the relay 12 exercises insufficient torque to move the movable contact 55 to its closing position against the contact 60. On the other hand if all phase conductors of the feeder circuit 4 are rotated 120° or 240° the phase relationship between the current flowing in the winding 49 and the current flowing in the winding 11 is such that substantially no torque is applied to the movable contact 55 or a torque if applied is applied in the tripping direction. Under any of these conditions the network circuit breaker 13 fails to close.

For many installations the system thus far described is adequate. In certain cases, however, it is desirable to provide the auxiliary relay 14 for tripping the network circuit breaker 13 when power flows from the network circuit 1 to the feeder circuit 4. The auxiliary relay 14 may include a conventional induction disc type of relay having a voltage winding 71 energized in accordance with the voltage between a phase conductor A and ground and having a current winding 72 energized in accordance with the current flowing through a phase conductor A which may be derived through a current transformer 73. The induction disc element may be so adjusted that when power flows from the feeder circuit to the network circuit 1 a movable contact 74 is actuated away from a fixed contact 75 but when power flows from the network circuit 1 to the feeder circuit 4, the induction disc element reverses to close the contacts 74 and 75.

If it is desired to trip the circuit breaker only when the reverse current reaches a predetermined magnitude, an overcurrent relay 76 may have its contacts connected in series with the contacts 74, 75 and may have its energizing winding connected in series with the current winding 72. The relay 76 may be so adjusted that when a predetermined current is exceeded, such as full load current, it picks up to close its front contacts 77. Consequently when power flows from the network circuit 1 to the feeder circuit 4 in excess of full load current, a tripping circuit for the circuit breaker 13 is established from the conductor C through the conductor 61, the contacts 74, 75 and 77, the winding 63 of the tripping solenoid, the pallet switch 64 and the conductor 65 to the phase conductor A. An example of a condition under which the auxiliary relay 14 would be desirable is that condition in which all three phase conductors of the feeder circuit 4 are short circuited or grounded. Under this condition the amount of carrier current or current of superimposed frequency received at the network protector may be insufficient to actuate the movable contact 55 into its circuit breaker tripping position.

In the embodiment of my invention illustrated in Fig. 2, energy is transmitted from the transformer 15 to the winding 11 of the relay 12 through an oscillator 8, coupling condensers 30, feeder circuit 4, coupling condensers 44, band pass filter 9 and full wave rectifier 10. If desired, this system of transmission may be replaced by a pilot wire system as illustrated in Fig. 5. As shown in Fig. 5, the secondary of the transformer 15 is directly connected to the winding 11 through pilot wires 78, one of which, of course, may be ground. With this system of transmission the rectifier 17, oscillator 8, coupling condensers 30 and 44, band pass filter 9 and full wave rectifier 10 may be omitted. The operation of the system shown in Fig. 5 otherwise is similar to the operation of the system shown in Fig. 2. The mid-terminal tap of the secondary winding of the transformer 15 now is directly connected to one terminal of the winding 11 and the left-hand or right-hand terminal of the secondary winding is connected to the remaining terminal of the winding 11 dependent upon the position of the feeder circuit breaker 5. Consequently, the currents flowing in the winding 11 in the two positions of the circuit breaker 5 will be displaced in phase by 180°. The timing relays 23 and 25 serve in the same manner to deenergize the pilot wires 78 after a time interval has elapsed after each operation of the circuit breaker 5 sufficient to assure operation of all network protectors controlled by the pilot wires 78.

For carrier current operation it may be desirable to provide high frequency blocking elements 80 for limiting the flow of superimposed frequency current to specific feeders. Each blocking element may comprise a resonant circuit tuned to the superimposed frequency, but offering little impedance to power current.

Although I have described my invention with reference to certain specific embodiments thereof, it is obvious that numerous modifications thereof are possible. Therefore, I do not wish my invention to be restricted except as required by the appended claims when interpreted in view of the prior art.

I claim as my invention:

1. In a network distribution system, an electrical circuit, a first circuit breaker having contacts for connecting and disconnecting parts of said electrical circuit, a second circuit breaker, operating means for tripping and closing said second circuit breaker, energizing means including auxiliary switch means on said first circuit breaker and including means for transmitting energy from said auxiliary switch means to said operating means for energizing said operating means, said auxiliary switch means being effective when said first circuit breaker is actuated to its circuit connecting condition for energizing said operating means over said transmitting means to close said second circuit breaker and being effective when said first circuit breaker is actuated to circuit disconnecting condition for energizing said operating means over said transmitting means to trip said second circuit breaker, and means for restricting each of said energizations to a predetermined time.

2. In a network distribution system, an electrical circuit, a first circuit breaker having contacts for connecting and disconnecting parts of said electrical circuit, a second circuit breaker, operating means for said second circuit breaker, energizing means including auxiliary switch means on said first circuit breaker for energizing said operating means, said auxiliary switch means being effective when said first circuit breaker is actuated to its circuit connecting condition for energizing said operating means to close said second circuit breaker and being effective when said first circuit breaker is actuated to circuit disconnecting condition for energizing said operating means to trip said second circuit breaker, and means effective a predetermined time after an actuation of said first circuit breaker to one of said conditions for interrupting the energization of said operating means and effective for conditioning said energizing means for an actuation of said second circuit breaker when said first circuit breaker is actuated to the other of said conditions.

3. In an electrical distribution system, a circuit control device operable between a first condition and a second condition, and operating means for said circuit control device including relay means having first contact means and second contact means, and switch means selectively operable into one state for energizing said operating means through said first contact means to actuate said circuit control device to said first condition and for energizing said relay means to open said first contact means, and into a second state for energizing said operating means through said second contact means to actuate said circuit control device to said second condition and for energizing said relay means to open said second contact means.

4. In an electrical distribution system, a circuit control device operable between a first condition and a second condition, and operating means for said circuit control device including relay means having first contact means and second contact means, and switch means selectively operable into one state for energizing said operating means through said first contact means to actuate said circuit control device to said first condition and for energizing said relay means to open said first contact means, and into a second state for energizing said operating means through said second contact means to actuate said circuit control device to said second condition and for energizing said relay means to open said second contact means, said relay means operating to open said contact means only after a predetermined time delay.

5. In a network distribution system, a source of electrical energy, a feeder circuit having a plurality of main conductors energized from said source, a circuit breaker adjacent a first end of said feeder circuit, operating means for tripping said circuit breaker, means adjacent a second end of said feeder circuit for controlling said operating means including a second source of alternating voltage having a frequency other than that of said first source, means for applying a voltage from said second source between each of said main conductors and a common conductor and means responsive to said alternating voltage for actuating said operating means into tripping condition, and means responsive to a reversal of energy flow in said feeder circuit for tripping said circuit breaker.

6. In a network distribution system, a polyphase source of electrical energy, a polyphase feeder circuit having a plurality of main conductors energized from said source, a circuit breaker adjacent a first end of said feeder circuit, operating means for tripping said circuit breaker, and means adjacent a second end of said feeder circuit for controlling said operating means including a second source of alternating voltage having a frequency other than that of said first source, means for applying a voltage from said second source between each of said main conductors and a common conductor, and means adjacent said first end of said feeder circuit connected between each of said main conductors and said common conductor for energization from said second source, said last-named means being operatively connected for energizing said operating means in accordance with energy received from said second source, and means responsive to a reversal of energy flow in said feeder circuit for tripping said circuit breaker.

7. In a network distribution system, a polyphase feeder circuit, a feeder circuit breaker positioned adjacent a first end of said feeder circuit for supplying energy thereto, a network circuit breaker positioned adjacent a second end of said feeder circuit for receiving energy therefrom, a relay adjacent said network circuit breaker including a coil energized in accordance with the positive phase sequence component of the voltage of said feeder circuit, a second coil, and relay contact means operable into either of two conditions in accordance with the phase relationships of the energizations of said two coils, means for supplying to said second coil a first energization for operating said relay contact means into one condition, means for supplying to said second coil a second energization for operating said relay contact means into a second condition, means controlled by the condition of said relay contact means for opening and closing said network circuit breaker, switch means controlled by the condition of said feeder circuit breaker for determining the energization of said second coil, and time delay means for restricting each energization of said second coil to a predetermined time.

8. In a network distribution system, a polyphase feeder circuit, a feeder circuit breaker positioned adjacent a first end of said feeder circuit for supplying energy thereto, a network circuit breaker positioned adjacent a second end of said feeder circuit for receiving energy therefrom, a relay adjacent said network circuit breaker including a coil energized in accordance with the positive phase sequence component of the voltage of said feeder circuit, a second coil, relay contact means operable into either of two conditions in accordance with the phase relationships of the energizations of said two coils, means for supplying to said second coil a first energization for operating said relay contact means into one condition, means for supplying to said second coil a second energization for operating said relay contact means into a second condition, means controlled by the condition of said relay contact means for opening and closing said network circuit breaker, switch means controlled by the condition of said feeder circuit breaker for determining the energization of said second coil, time delay means for restricting each energization of said second coil to a predetermined time, and means responsive to a reversal of energy flow in said feeder circuit for tripping said network circuit breaker.

9. In a network distribution system, a source of electrical energy, a feeder circuit, feeder circuit breaker for operatively connecting said feeder circuit to said source, a network circuit, a network circuit breaker for operatively connecting said network circuit to said feeder circuit, operating means for tripping and closing said network circuit breaker, and control means selectively operable from a point adjacent said feeder circuit breaker for transmitting over a common channel either a closing impulse or an opening impulse to said operating means for closing or opening said network circuit breaker, and means for restricting each of said impulses to a predetermined time interval.

10. In a network distribution system, a source of electrical energy, a feeder circuit, a feeder circuit breaker for operatively connecting said feeder circuit to said source, a network circuit, a network circuit breaker for operatively connecting said network circuit to said feeder circuit, operating means for tripping and closing said network circuit means, and control means selectively operable from a point adjacent said feeder circuit breaker for transmitting over a common channel either a closing impulse or an opening impulse to said operating means for closing or opening said network circuit breaker, means for restricting each of said impulses to a predetermined time interval, and means responsive to a flow of energy from said network circuit to said feeder circuit for tripping said network circuit breaker.

JOHN S. PARSONS.